Aug. 10, 1926.

J. H. ASHBAUGH 1,595,750

REGULATOR SYSTEM

Filed June 24, 1924    3 Sheets-Sheet 1

WITNESSES:

INVENTOR
John Harvey Ashbaugh
BY
ATTORNEY

Aug. 10, 1926.

J. H. ASHBAUGH 1,595,750

REGULATOR SYSTEM

Filed June 24, 1924  3 Sheets-Sheet 3

WITNESSES:

INVENTOR
John Harvey Ashbaugh.
BY
ATTORNEY

Patented Aug. 10, 1926.

1,595,750

UNITED STATES PATENT OFFICE.

JOHN HARVEY ASHBAUGH, OF WILKINSBURG, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed June 24, 1924. Serial No. 722,048.

My invention relates to electric regular systems and it has special relation to systems for maintaining substantially constant voltage conditions upon a power circuit.

One object of my invention is to provide a regulator system that shall be quickly responsive to correct the variations in a predetermined characteristic of a power circuit.

Another object of my invention is to provide a regulator system of the above-indicated character that shall be operative over a range of voltage that is limited only by the capacity of the machines connected to the system.

Another object of my invention is to provide a regulator system of the above-indicated character, having anti-hunting means to prevent over-travel of the means for extending the range of operation of the system.

More specifically, my invention relates to an alternating-current system embodying a synchronous condenser that is excited by means of an auxiliary or exciter generator. A vibrating-contact regulator is provided for adjusting the voltage of the exciter generator in accordance with the line voltage.

In operating synchronous condensers for improving the power-factor of voltage of a transmission line, if the excitation of the condenser field-magnet winding be reduced below the residual voltage of the exciter generator and properly regulated at such voltages, it is possible to utilize a comparatively small condenser to produce a given power-factor or voltage correction on the line. By the use of means for extending the range of excitation below that of the residual voltage of the exciter generator, it is also possible to provide a synchronous condenser requiring a smaller excitation current than would otherwise be required and to materially increase the range of operation of the condenser by lowering the field excitation thereof to correct a power-factor corresponding to a lagging current.

In the system of the present invention, the under-excitation of the condenser field-magnet winding is accomplished by inserting the resistor of a motor-operated rheostat in the circuit between the exciter and the condenser field-magnet winding. The rheostat is controlled by means of an electro-magnet that is energized in accordance with the voltage of the exciter generator. As the voltage of the exciter generator decreases, approaching the residual voltage thereof, the electro-magnet will energize the rheostat motor to operate it in a direction to insert resistance in circuit with the condenser field winding.

This increasing resistance of the condenser field-winding circuit causes the regulator to increase the exciter generator voltage sufficiently to maintain the proper excitation of the synchronous condenser.

Anti-hunting means is provided so that the change in excitation of the control magnet will vary disproportionally with respect to the change in the exciter generator voltage. This anti-hunting means anticipates the effect of the changing excitation of the condenser field-magnet winding, so that the motor-operated rheostat is brought to rest at the proper point by modifying the energization of the control magnet.

My invention will be better understood by reference to the accompanying drawings, wherein—

Figure 1:
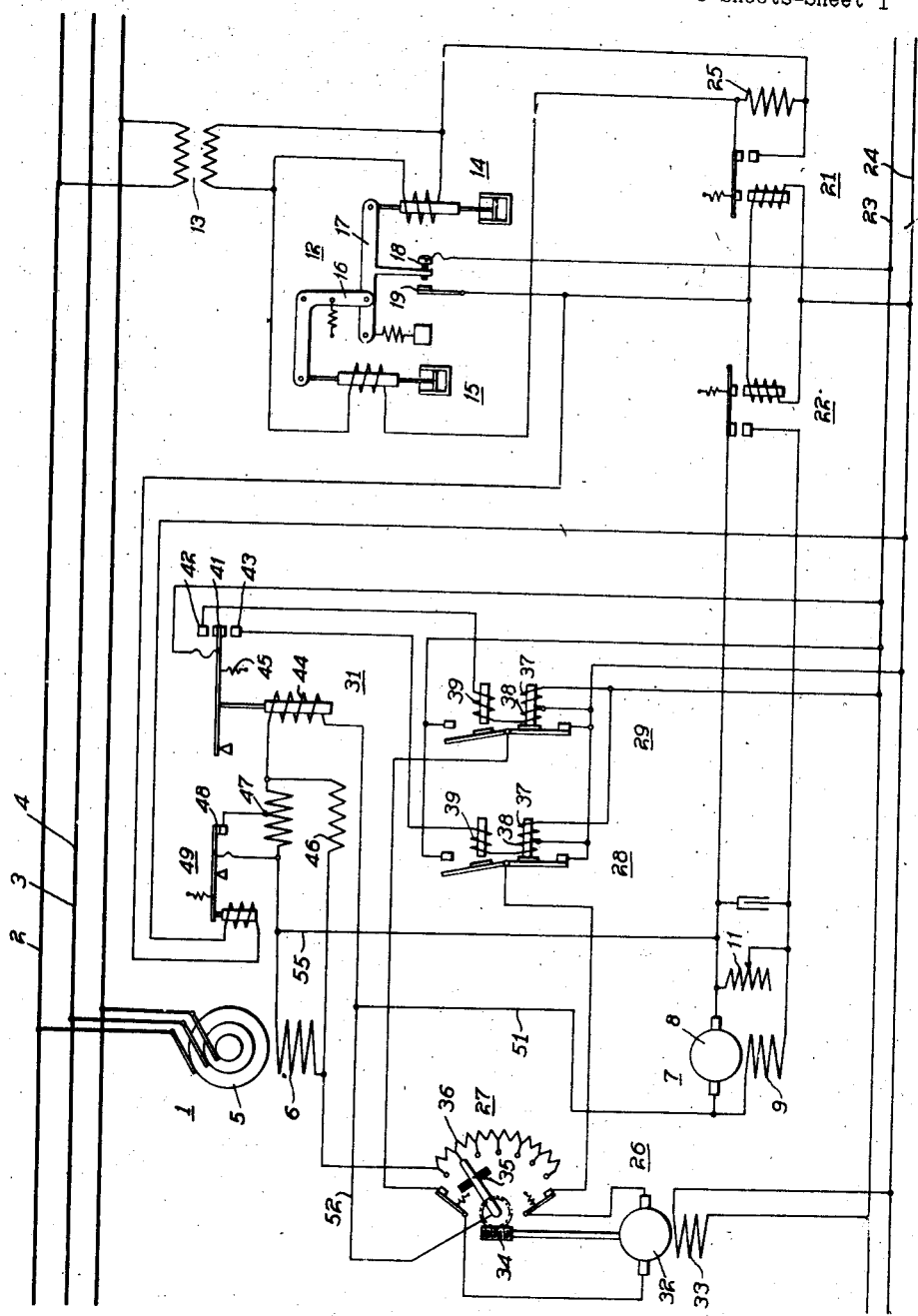
Figure 1 is a diagrammatic illustration of one form of the system and apparatus embodying my invention.

Referring to the form of the invention illustrated in Fig. 1 of the drawing, a synchronous condenser 1 is connected to power circuit 2, 3, 4, being provided with an armature winding 5 and a field-magnet winding 6. The field-magnet winding is energized from an exciter generator 7 having an armature 8 and a field-magnet winding 9. A resistor 11 is connected in series relation with the field winding 9, the exciter voltage being controlled by means of a vibratory regulator 12, which intermittently shunts the resistor 11.

A transformer 13 connects the operating magnets 14 and 15 of the regulator 12 with the power circuit 2, 3, 4. The magnets 14 and 15 co-operate through levers 16 and 17 to intermittently make and break the circuit through the contact members 18 and 19, in accordance with the voltage variations of the power circuit. The main contact members 18 and 19 control the operation of relays 21 and 22, which have parallel-connected coils energized from a direct-current circuit 23 and 24. The relay 21 shunts a resistor 25 that is connected in series circuit relation with the winding of magnet 15, thus giving this magnet a vibratory action.

The relay 22 shunts the resistor 11, which is connected in series relation with the field-magnet winding 9 of the exciter generator, thus controlling the exciter generator voltage. During periods when the voltage impressed upon the field winding 6 of the synchronous condenser is required to be of a value above that of the residual voltage of the exciter generator 7, this voltage is controlled by the action of regulator 12, in a well-known manner. When the power circuit conditions require an excitation of the field-magnet winding 6 below that of the residual voltage of the exciter generator 7, a pilot motor 26, which is operatively connected to a rheostat 27, causes the rheostat to be inserted in circuit with the field winding 6 to reduce the excitation thereof with respect to the exciter generator.

The pilot motor 26 is provided with an armature winding 32 and a field winding 33. The field winding 33 is energized from the direct-current circuit 23, 24. The motor armature winding 32 is energized in accordance with the operation of reversing switches 28 and 29, which are governed by means of a control relay 31. The motor 26 is mechanically connected through gearing 34 with the movable arm 35 of the rheostat to control the amount of resistor 36 that is maintained in series relation with the field winding 6.

The reversing switches 28 and 29 are each provided with a pair of electro-magnets, one of which is provided with a holding coil 37 that is permanently energized from the circuit 23, 24, and with a differentially-wound coil 38, which is connected in series circuit relation with a coil 39 that is wound upon the other magnet core and adapted to be energized in accordance with the operation of contact member 41 of the relay 31. The reversing switches 28 and 29 are shown in their normally inoperative position. If the contact member 41 engages stationary contact member 42, the reversing switch 29 is actuated, causing the pilot motor 26 to operate in one direction, whereas if the contact member 41 engages the other stationary contact member 43, the reversing switch 28 is actuated, causing the motor 26 to operate in a reverse direction.

The relay 31 is provided with a winding 44 that is energized from the exciter generator and is adapted to oppose the action of a tension spring 45 to operate the contact member 41.

A resistor 46 is provided to act as an anti-hunting means for the operation of the rheostat motor, and is connected in parallel circuit relation to the exciter generator 7 and to the field winding 6. A resistor 47 is connected to control the current through the relay winding 44. A proportion of this resistor 47 is normally shunted by contact members 48, which are separated by means of a relay 49 that is actuated in accordance with the operation of the regulator 12. For this purpose, the actuating coil of relay 49 may be connected in parallel relation to the actuating coil of relay 22.

The relay 49 is of the inverted type, that is, the contact members 48 are operated in an opposite manner from the main regulator contact members 18, 19, opening when the main contact members close, and closing when the main contact members open. The relay 49 increases the range of the control relay 31 by varying the effective value of the resistor 47 as the exciter generator voltage varies.

When the line circuit voltage is such as to increase the proportion of time during which the main regulator contact members 18 and 19 remain closed, corresponding to an increase in the exciter generator voltage, the time during which the contact members 48 are maintained separated correspondingly increases, thus increasing the effective value of the resistor 47. Similarly, when the regulator operates to decrease the exciter generator voltage, the effective value of the resistor 47 will be correspondingly decreased. It will be seen, therefore, that the effect of the resistor 47 is to limit the range of voltage variations upon the relay winding 44 and to stabilize the operation thereof.

The circuit from the exciter generator through the field winding 6, is as follows: Beginning with the left-hand terminal of the generator 7, a circuit leads through conductors 51 and 52, rheostat arm 35, field winding 6, and conductor 55 to the right-hand terminal of the exciter generator 7. It will be noted that the control relay winding 44 is connected between the rheostat arm 35 and the variable resistor 47, while the anti-hunting resistor 46 is connected between the resistor 47 and one terminal of the rheostat 27, so that the winding 44 and the resistor 46 are each connected in parallel circuit relation to the exciter generator 7 and the field winding 6. It will also be noted that the rheostat 27 is inserted between conductor 52 and field-winding 6, so that the anti-hunting resistor 46 is connected on the condenser field side of the rheostat, while the winding 44 is connected on the exciter generator side of the rheostat.

The operation of the rheostat is as follows: During the normal operation of the system, where voltages above that of the residual voltage of the exciter generator are impressed upon the condenser field-magnet winding, the rheostat 27 is in its "all out" position. As the voltage across the field winding 6 aproaches the residual voltage of the exciter 7, the energization of the control magnet winding 44 is decreased to such a value that the spring 45 causes the contact member 41 to engage the contact member 43, thus operating the reversing switch 28, which in turn operates the pilot motor 26 to insert a part of the resistance of the rheostat 27 in circuit with the field winding 6. As this resistance is being inserted, the voltage of the exciter generator is thereby caused to increase, since the regulator 12 operates to govern the excitation of the condenser field winding in accordance with line circuit conditions, irrespective of the resistance in the excitation circuit. An increase in the exciter generator voltage causes an increase in the energization of the control magnet winding 44, which thereupon effects the separation of the contact members 41 and 43 to de-energize the pilot motor 26.

The effect of the anti-hunting resister 46 is to cause a current to flow from the exciter generator 7 greater than that required for energizing of the condenser field winding 6, by increasing the IR drop between the generator 7 and the field winding 6 thereby causing the exciter generator voltage to rise more rapidly than would be the case were it providing energization for the field winding 6 alone. This increased rise in the exciter voltage causes an increased energization of the control magnet winding 44, causing an earlier separation of the contact members 41 and 43 and thereby producing the desired anti-hunting effect. Should the voltage of the exciter generator be again raised sufficiently above the residual voltage thereof, the increased energization of the control magnet winding 44 causes contact members 41 and 42 to engage, thereby operating the reversing switch 29 to energize the pilot motor 26, causing it to rotate in a direction to remove the resistance of the rheostat 27 from the condenser field circuit.

Figure 2:
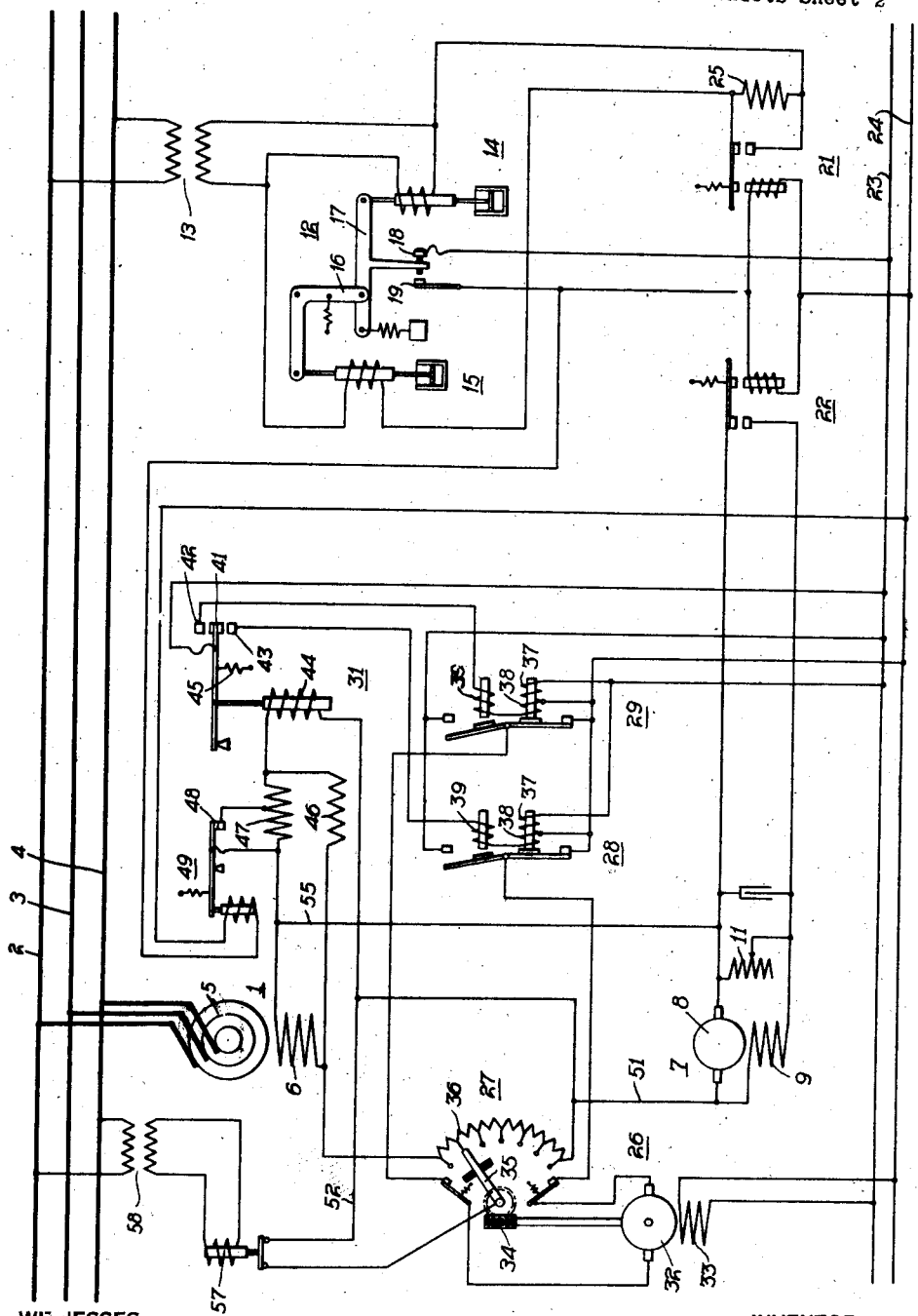
Fig. 2 illustrates a modification thereof including quick-acting protective means.

The system illustrated in Figure 2 of the drawings is similar to that illustrated in Figure 1, but provides a permanent connection between the field winding 6 and the exciter generator 7, through the resistor element 36 of the rheostat 27. This system also provides a quick-acting relay 57, which is energized from the circuit 1, 2, 3, and is adapted, upon an excessive rise in line voltage, to open the circuit between conductor 52 and the rheostat arm 35, thus quickly inserting in series relation with the condenser field winding 6, the entire resistor 36. Inserting the resister 36 in circuit with the condenser field winding 6 causes a decrease in the voltage thereof and an increase in the voltage of the exciter generator. Thus an increase in the energization of the control magnet winding 44 is produced, causing the pilot motor 26 to operate the rheostat 27 to its "all in" position. As the voltage upon the line assumes normal value, the relay 57 will again close and the normal operation of the system will continue.

Figure 3:
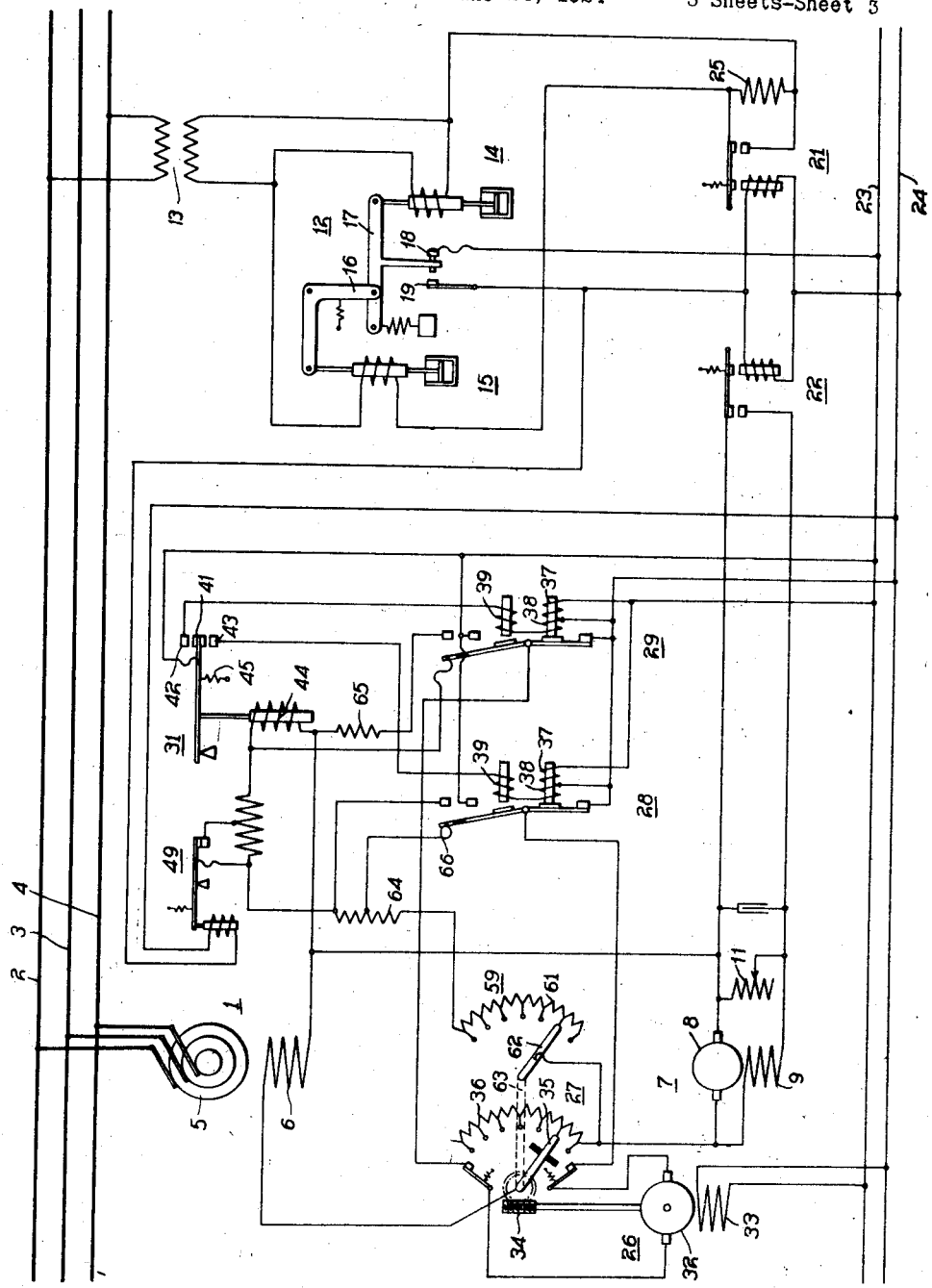
Fig. 3 illustrates another modification of the system utilizing a separate anti-hunting rheostat in the control magnet circuit.

In the form of the invention illustrated in Figure 3, a rheostat 59 is provided and is connected by means of shaft 63 to the rheostat 27, so that both rheostat 59 and rheostat 27 are operated in accordance with the energization of the pilot motor 26. The rheostat 59 is provided with a resistor 61 and a control arm 62 and is connected in series circuit relation with the control magnet winding 44. The rheostat 59 is connected so that the resistance thereof is increased whenever the resistance of the rheostat 27 is decreased. A resistor 64 is also provided in series circuit relation with the winding 44, a portion of which resistor is adapted to be shunted upon the operation of the reversing switch 28. A resistor 65 is also provided and is adapted to be connected in parallel circuit relation to the winding 44 upon the actuation of the reversing switch 29.

Assuming the voltage upon the condenser field winding 6 to be above the residual voltage of the exciter generator 7, the rheostat 27 will normally be in its "all out" position, while the rheostat 59 will be in its "all in" position. As the voltage upon the field winding 6 decreases to substantially residual voltage of the exciter generator, the energization of the winding 44 decreases until the contact member 41 engages contact member 43 to operate the reversing switch 28 and energize the pilot motor 26, causing it to rotate in a direction to increase the resistance in circuit with the field winding 6 and decrease the resistance in circuit with the control winding 44.

Upon the operation of the switch 28, a portion of the resistor 64 is shunted through contact members 66, thus increasing the energization of the winding 44. The operation of the rheostat 59 toward its "all out" position, still further increases the energization of the winding 44, so that the resistor 64 and the rheostat 59 both act as anti-hunting means. Again, the operation of the reversing switch 29 connects resistor 65 in parallel circuit relation to the winding 44, thus reducing the energization thereof, while at the same time the rheostat 59 is operated toward its "all in" position, thereby still further decreasing the energization of the winding 44. Thus the resistor 65 and the rheostat 59 again both operate as anti-hunting means.

Modifications in the system and arrangement and location of parts may be made within the spirit of my invention, and I do not wish to be limited other than by the scope of the appended claims.

I claim as my invention:—

1. In a regulator system, the combination with a transmission line, a synchronous condenser connected thereto and having a field-magnet winding and an exciter generator therefor, of regulator means controlled in accordance with an operating characteristic of said line and adapted to control the excitation of said field-magnet winding to substantially the residual voltage of said exciter, means connected in circuit with said exciter for varying the resistance value of said circuit, control means therefor comprising electro-responsive means actuated in accordance with the voltage of said exciter generator circuit, and means for modifying the excitation of said electro-responsive means to prevent hunting action in said system.

2. In a regulator system, the combination with a transmission line, a synchronous condenser connected thereto and having a field-magnet winding, and an exciter generator therefor, of regulator means controlled in accordance with an operating characteristic of said line and adapted to control the excitation of said field-magnet winding to substantially the residual voltage of the exciter, means for extending the range of operation of said exciter comprising means for varying the circuit of said exciter generator and electro-responsive control means therefor actuated in accordance with the excitation of said field-magnet winding, and anti-hunting means for gradually varying the energization of said electro-responsive control means in accordance with the operation of said circuit-varying means.

3. In a regulator system, the combination with a power circuit, a dynamo-electric machine connected thereto and having a field-magnet winding, and an exciter generator therefor, of regulator means for controlling the excitation of said dynamo-electric machine, and means for varying the excitation of said dynamo-electric machine below the residual voltage of said exciter, said means comprising a motor-operated rheostat, electro-responsive control means therefor and anti-hunting means for varying the energization of said electro-responsive control means in accordance with the operation of said rheostat.

4. In a regulator system, the combination with a power circuit, a dynamo-electric machine connected thereto and having a field-magnet winding, and an exciter generator therefor, of regulator means for controlling the excitation of said dynamo-electric machine, and means for varying the excitation of said dynamo-electric machine below the residual voltage of said exciter, said means comprising a motor-operated rheostat, electro-responsive control means therefor, and resistor means connected in parallel circuit relation to said electro-responsive control means for varying the energization thereof to prevent hunting action.

5. In a regulator system, the combination with a power circuit, a dynamo-electric machine connected thereto and having a field-magnet winding, and an exciter generator therefor, of regulator means for controlling the excitation of said dynamo-electric machine, and means for varying the excitation of said dynamo-electric machine below the residual voltage of said exciter, said means comprising a motor-operated rheostat, electro-responsive control means for said rheostat, and anti-hunting resistor means therefor, said electro-responsive means and said resistor means each being connected in parallel circuit relation to said field-magnet winding, said rheostat being connected between said electro-responsive means and said resistor means in series circuit relation with said field-magnet winding.

6. In a regulator system, the combination with a power circuit, a dynamo-electric machine connected thereto and having a field-magnet winding, and an exciter generator therefor, of regulator means for controlling the excitation of said dynamo-electric machine, and means for varying the excitation of said dynamo-electric machine below the residual voltage of said exciter, comprising a motor-operated rheostat, electro-responsive control means for actuating said rheostat, and means actuated in accordance with power circuit conditions for shunting said rheostat.

7. In a regulator system, the combination with a power circuit, a dynamo-electric machine connected thereto and having a field-magnet winding and an exciter generator therefor, of regulator means for controlling the excitation of said dynamo-electric machine, and means for varying the excitation of said dynamo-electric machine below the residual voltage of said exciter, comprising a variable resistor means, electro-responsive control means therefor, and anti-hunting means for said electro-responsive control means adapted to vary the energization thereof in accordance with the operation of said variable resistor means.

In testimony whereof, I have hereunto subscribed my name this 19th day of June 1924.

JOHN H. ASHBAUGH.